(No Model.)
T. A. BROMELL.
PLOW.
No. 439,719.  Patented Nov. 4, 1890.
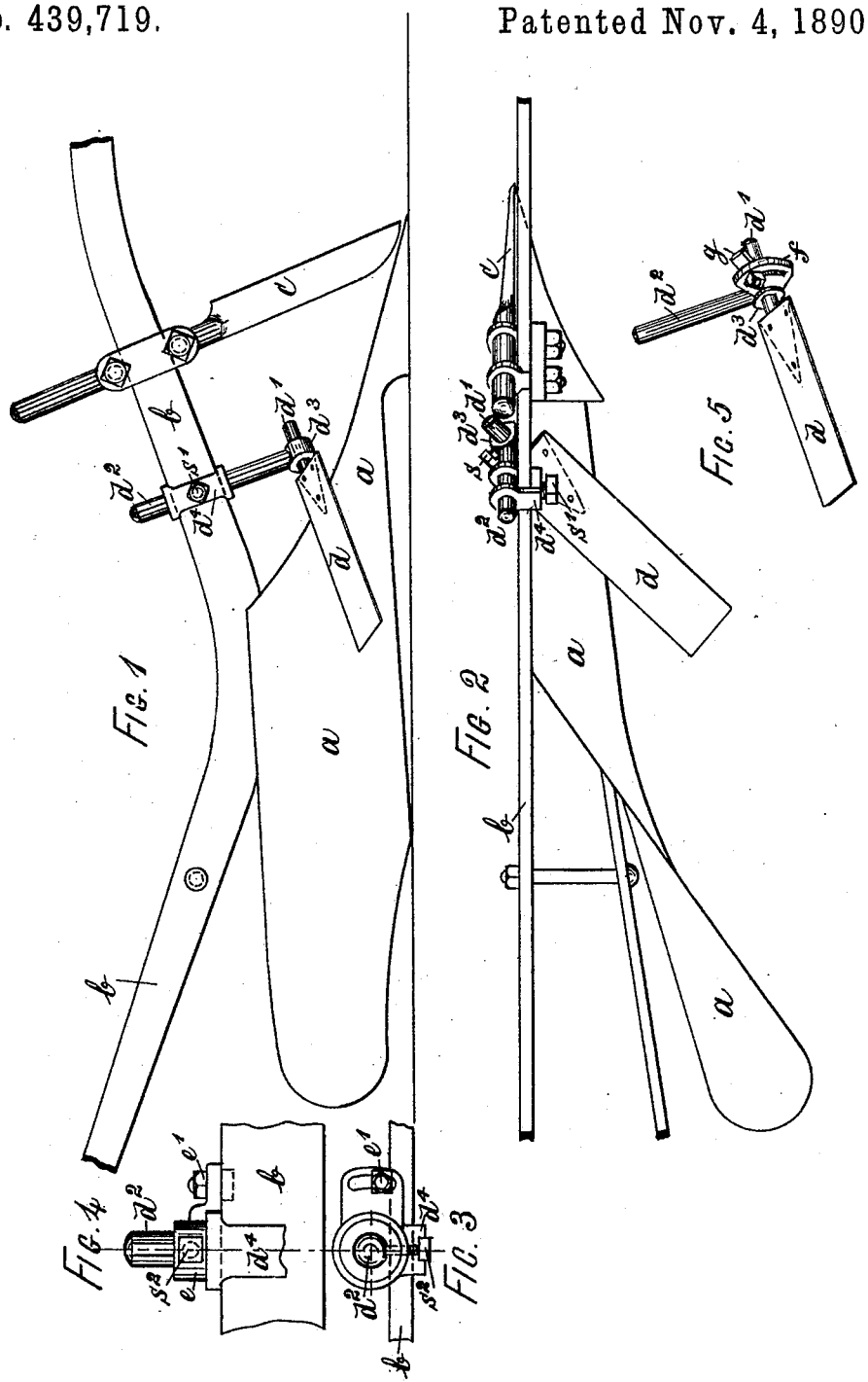

UNITED STATES PATENT OFFICE.

THOMAS ANDREW BROMELL, OF NELSON, NEW ZEALAND.

PLOW.

SPECIFICATION forming part of Letters Patent No. 439,719, dated November 4, 1890.

Application filed March 4, 1890. Serial No. 342,645. (No model.)

*To all whom it may concern:*

Be it known that I, THOMAS ANDREW BROMELL, farmer, a subject of the Queen of Great Britain, residing at Nelson in the colony of New Zealand, have invented a certain new and useful Attachment for Plows, of which the following is a specification.

My invention relates to a new and useful attachment for plows, having for its object to skim off the turf or upper side of the soil as it is in the act of being turned over by the mold-board of the plow in such manner that the upper surface of the land which is being plowed or a portion of it is turned down into the furrow and is immediately afterward buried by the mold-board. I accomplish this object by the devices illustrated in the accompanying drawings, in which—

Figure 1 is a side view of a plow, showing my attachment. Fig. 2 is a plan of the same. Fig. 3 is a plan, and Fig. 4 a side view upon a larger scale, of a slightly-modified clip or fastening for more securely holding the improved attachment; and Fig. 5 is a perspective view of a method of securely holding the skimming-plate in any desired position.

Similar letters refer to similar parts throughout the several figures.

The improved attachment consists of a cutter formed of a flat plate $d$ of steel having a projecting stem or pin $d'$ formed upon it or attached to it by rivets, bolts, or screws. The stem $d'$ fits into a socket $d^3$, in which it is free to move, when desired, but is (when in use) firmly held by the set-screw $s$, Fig. 2. The socket $d^3$ has a stem $d^2$ formed upon it, which is attached to the beam $b$ of the plow by the clip $d^4$ and set-screw $s'$. In order to still more firmly hold the stem $d^2$ and prevent it from turning in the socket $d^3$, I pass a clip $e$ over the top of the stem $d^2$, as shown in Figs. 3 and 4, and I fasten the set-screw $s^2$ into a groove in the stem $d^2$; or the stem $d^2$ may be made square for the same purpose. A projecting piece having a slot is formed upon the clip $e$ and carries an adjustable bolt $e'$, the head of which presses against the side of the beam $b$ of the plow, and so prevents the stem $d^2$ from turning.

The entire attachment is fixed behind the colter $c$ of the plow and near the mold-board $a$, as shown.

The cutter-blade $d$ is made very simply and cheaply from a single plate of steel or other suitable metal. It can be readily ground to a sharp cutting-edge and kept bright, so as to cause very little friction or resistance when at work, and it can readily be repaired or reversed. It can be reversed by turning round its stem $d'$ in the socket $d^3$, and the angle of the blade to the beam of the plow can be altered by simply unscrewing the set-screw $s'$, while its plane can be set to any desired angle with the horizon by means of the set-screw $s$, Fig. 2. It can therefore be easily set to the exact position in which it will do its work with the greatest ease and with the least expenditure of power. It can be adapted to any sort or size of ordinary plow.

In order to hold the stem $d'$ of the blade $d$ more securely in the socket $d^3$, the arrangement shown in Fig. 5 may be used instead of the set-screw $s$. In this arrangement, $f$ is a slotted quadrant plate formed upon the boss $d^3$ of the stem $d^2$, and $g$ is an arm firmly fixed upon the stem $d'$, a bolt passing through the arm $g$ and the slot in the plate $f$ and holding the arm firmly in its position against the latter.

What I claim as my invention, and desire to secure by Letters Patent, is—

1. The combination of the cutting-plate $d$, stem $d'$, socket $d^3$, stem $d^2$, clip $d^4$, and set-screws $s$ and $s'$, all substantially as set forth and shown.

2. The combination, with the stem $d^2$ and clip $d^4$, of the clip $e$ and slotted quadrant and bolt $e'$, substantially as set forth, and shown in Figs. 3 and 4.

In witness whereof I have hereunto signed my name in the presence of two subscribing witnesses.

THOMAS ANDREW BROMELL.

Witnesses:
ARTHUR E. EDWARDS,
E. SCRIVERY.